US 6,968,411 B2

(12) United States Patent
Gaur et al.

(10) Patent No.: US 6,968,411 B2
(45) Date of Patent: Nov. 22, 2005

(54) INTERRUPT PROCESSING APPARATUS, SYSTEM, AND METHOD

(75) Inventors: Daniel R. Gaur, Beaverton, OR (US); Patrick L. Connor, Portland, OR (US)

(73) Assignee: Intel Corporation, Santa Clara, CA (US)

(*) Notice: Subject to any disclaimer, the term of this patent is extended or adjusted under 35 U.S.C. 154(b) by 437 days.

(21) Appl. No.: 10/100,718

(22) Filed: Mar. 19, 2002

(65) Prior Publication Data

US 2003/0182484 A1 Sep. 25, 2003

(51) Int. Cl.[7] ................................................ G06F 9/48
(52) U.S. Cl. ..................................... 710/260; 710/261
(58) Field of Search ................................. 710/260–269

(56) References Cited

U.S. PATENT DOCUMENTS 4,768,149 A * 8/1988 Konopik et al. ............. 710/47
6,148,361 A * 11/2000 Carpenter et al. .......... 710/260
6,499,078 B1 * 12/2002 Beckert et al. ............. 710/260
6,606,676 B1 * 8/2003 Deshpande et al. ......... 710/262
6,738,846 B1 * 5/2004 Slaughter et al. ........... 710/260

* cited by examiner

Primary Examiner—Tim Vo
(74) Attorney, Agent, or Firm—Schwegman, Lundberg, Woessner & Kluth, P.A.

(57) ABSTRACT

An interrupt processing apparatus, system, and article including a machine-accessible medium, along with a method of processing interrupts, implement interrupt processing in an efficient, parallel manner that reduces average interrupt latency. In one embodiment, the apparatus may include an interrupt receiver coupled to a plurality of interrupt handlers which respond to uniquely identified interrupting events. Responses may occur in an overlapping fashion in a multi-threaded environment. The system may include a processor coupled to a local memory and an interrupt receiver. Interrupt handlers, which may be coupled to the interrupt receiver, process uniquely identified interrupts. The method may include receiving multiple interrupts and executing corresponding interrupt handlers scheduled in response to receipt of the interrupts, with each handler being uniquely adapted to service a particular interrupting event.

21 Claims, 3 Drawing Sheets

INTERRUPT PROCESSING APPARATUS, SYSTEM, AND METHOD

TECHNICAL FIELD

Embodiments of the present invention relate generally to apparatus and methods used for program interrupt processing. More particularly, embodiments of the present invention relate to reducing the time required to respond to program interrupts, especially multiple interrupts.

BACKGROUND INFORMATION

A computer system may include one or more peripheral devices, which may take the form of an add-in adapter, such as a network interface card (NIC), a local area network (LAN) on motherboard, or an integrated chipset. Programs running on such a computer system generally utilize a device driver to access the various peripheral devices, as well as other systems and components. A device driver is a program or piece of code that controls a peripheral device, and the peripheral device may have its own set of specialized commands that the corresponding driver is uniquely configured to recognize. Most programs, however, access peripheral devices using a generic set of commands, and a device's driver accepts these generic commands from a program and translates the generic commands into specialized commands for the device. Tasks performed by a driver include, by way of example, executing data input and output (I/O) operations, carrying out error processing required by a device, and processing interrupts.

Thus, interrupt processing is a function which may be performed by a driver. Most peripheral devices coupled to a computer system generate an interrupt when they need some form of attention from a Central Processing Unit (CPU) or processor. This interrupt is usually an asynchronous event that suspends normal processing of the CPU. For instance, a network controller might interrupt to indicate reception of a new packet, or to indicate the successful transmission of an outgoing packet. Legacy devices generate interrupts by asserting an "interrupt line", which alerts the host processor to the interrupt; newer devices may use a "Message-Signaled Interrupt" instead.

A Message-Signaled Interrupt (MSI) is a mechanism for generating an interrupt in which the interrupting device writes a predetermined value (i.e., a "message") to a predetermined address in host memory. For example, a network controller might write a special "packet received" message to memory upon receipt of an incoming packet. The MSI value and address are unique to each device; while two devices may write to the same address, these two devices would not present the same message data for the interrupt, and thus, no two devices will share exactly the same message. In other words, the combination of address and message data are unique. Of course, a single device may identify any one of several different events within a message, also ensuring that every message will be unique.

FIG. 1 is a flow diagram for an exemplary prior art interrupt handling scheme. It should be noted that, regardless of which particular interrupt mechanism is used, conventional interrupt-handling schemes usually operate in the manner illustrated. Thus, driver documentation and samples (e.g., the Microsoft Device Driver Kit, and publicly-available driver development texts) describe and implement interrupt-handling procedures as a sequential series of steps, neglecting the inherent parallelism of their host devices. Thus, over a period of time 110, some event will occur at block 112, and a device will generate an associated hardware interrupt at block 114. After the computer system connected to the device recognizes the interrupt, the operating system schedules an interrupt handler to process the interrupt, in response to the interrupting event at block 116.

As mentioned previously, the interrupt handler operates in the form of a single, serial thread of execution. The single, monolithic handler thus processes multiple interrupting events in turn, as shown at blocks 118, 120, and 122. "Later" events are not processed until "earlier" events have been accommodated, increasing the average latency 124 associated with the "nth" event.

DESCRIPTION OF THE EMBODIMENTS OF THE INVENTION

Figure 1:
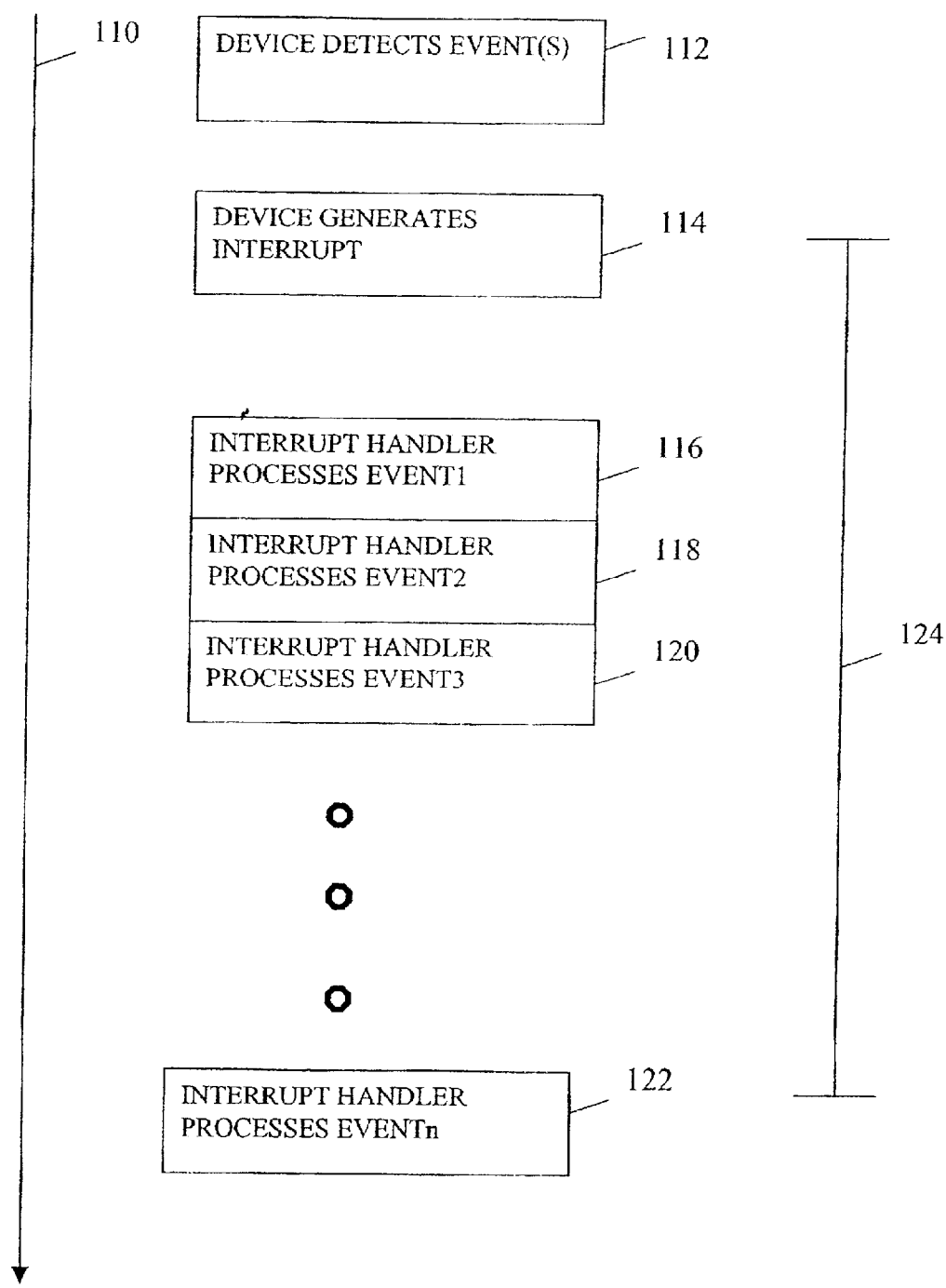
FIG. 1, previously described, is a flow diagram for an exemplary prior art interrupt handling scheme.

In the following detailed description of embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to understand and implement them. Other embodiments may be utilized and derived therefrom, such that structural and logical substitutions and changes may be made without departing from the scope of the present disclosure. The following detailed description, therefore, is not to be taken in a limiting sense, and the scope of embodiments of the invention is defined only by the appended claims, along with the full range of equivalents to which such claims are entitled.

Most devices are capable of generating interrupts in response to more than one type of event (e.g., a network controller can interrupt on both packet reception and packet transmission). By assigning a unique MSI message, including the event and device address, for example, to each interrupting event, the device can simultaneously indicate the precise event and signal the interrupt at the same time. Therefore, when one such event occurs, the device may interrupt by writing the corresponding, unique message value to host memory. This in turn allows the operating system or device driver to schedule an interrupt handler specific to that event. The contents and address of the message imply both the device and event that triggered the interrupt; therefore, no additional processing or logic is required to determine the source or cause of the interrupt.

Handlers may be optimized for a predetermined event, since they execute only in response to that event. Average interrupt latency is also reduced, since handlers may execute in parallel; processing of one particular event need not delay the processing of other, unrelated events.

For example, the network controller described previously might interrupt to indicate reception of an incoming packet, transmission of an outgoing packet, or a change in link status. Each of these events utilizes a separate MSI message. In this case, the device driver may implement three different handlers, one for each message type. When, for example, the controller interrupts by writing the "packet received" message, the operating system schedules the "packet received" handler to process the incoming packet. If the controller then immediately interrupts by writing the "packet transmitted" message, the operating system may schedule the "packet transmitted" handler to process the incoming packet. Such processing may occur in tandem or overlapping fashion with the processing accomplished by the "packet received" handler, reducing the interrupt latency for the packet transmission interrupt event processing. The processing of the packet reception event therefore does not delay processing of the packet transmission event. Since the controller in this example has written no further messages, no other handlers are executed.

Figure 2:
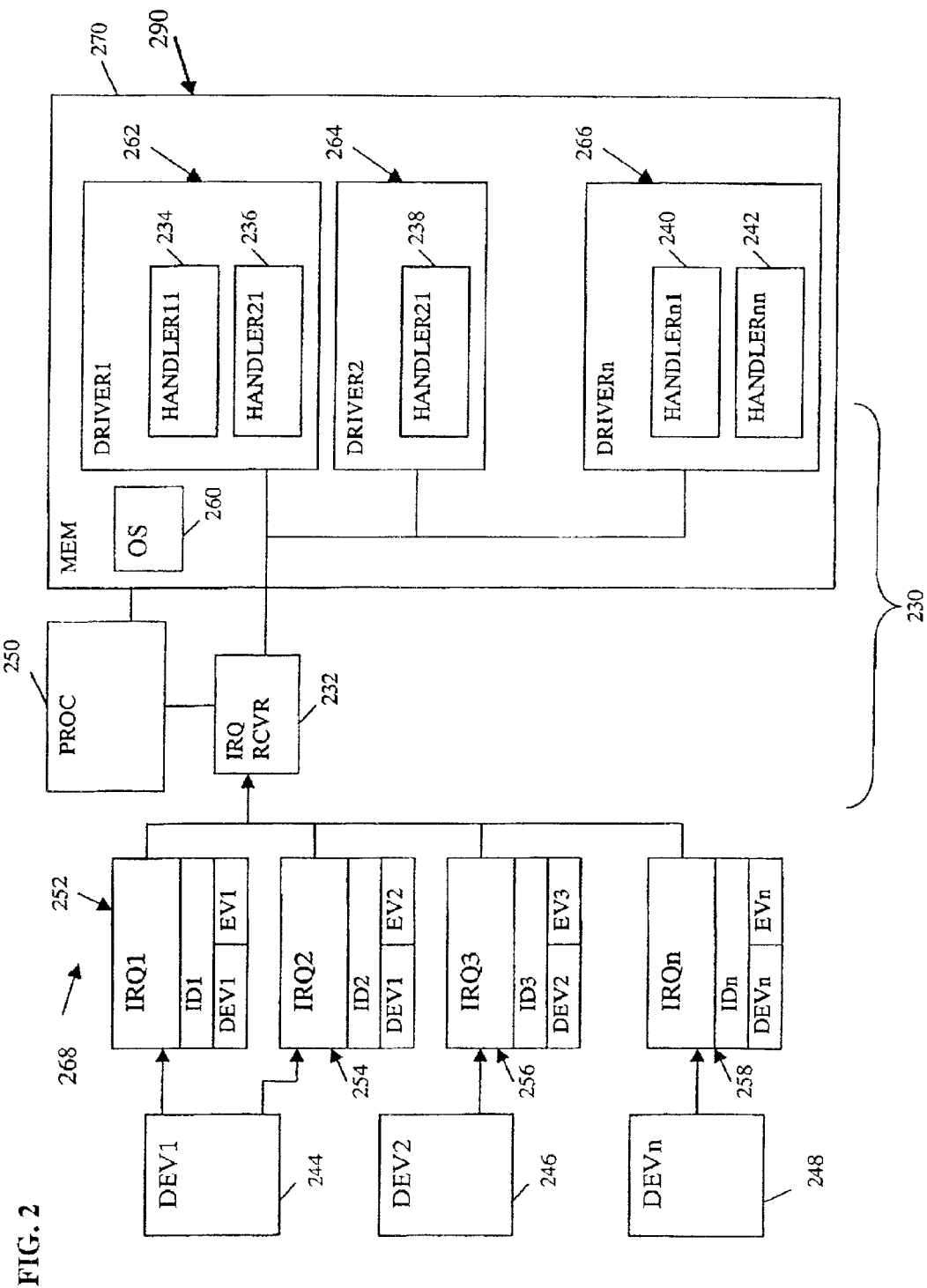
FIG. 2 illustrates a block diagram of an apparatus, an article including a machine-accessible medium, and a system according to various embodiments of the present invention.

FIG. 2 illustrates a block diagram of an apparatus, an article including a machine-accessible medium, and a system according to various embodiments of the present invention. In one embodiment of the invention, the apparatus 230 may include an interrupt receiver 232 and any number of interrupt handlers 234, 236, 238, 240, 242 capable of being operatively coupled to the interrupt receiver 232. The interrupt receiver 232 may be implemented using a device similar to, or identical to, a programmable interrupt controller, such as the Intel® 82093AA I/O Advanced Programmable Interrupt Controller.

As described previously, one or more devices 244, 246, and 248, such as printers, monitors, scanners, NICs, modems, and other peripherals and circuitry are capable of being operatively coupled to the interrupt receiver 232 (directly, or via the processor 250) and of generating interrupts upon the occurrence of selected events. For example, if the device 244 is a NIC, the interrupt 252 may represent a "packet received" interrupt, and the interrupt 254 may represent a "packet transmitted" interrupt. Each of the interrupts 252, 254 may be accompanied by identifying information ID1 and ID2, respectively. For example, if the interrupts 252, 254 are MSIs, then the identifying information ID1 and ID2 may be the unique "messages" associated with each interrupt. Thus, the identifying information ID1 for the interrupt 252 may include a device identification DEV1 (i.e., "NIC") and an event identification EV1 (i.e., "packet received"). Similarly, the identifying information ID2 for the interrupt 254 may include a device identification DEV1 (i.e., "NIC") and an event identification EV2 (i.e., "packet transmitted").

If the device 246 is a printer, for example, then the identifying information ID3 for the interrupt 256 may include a device identification DEV2 (i.e., "PRINTER") and an event identification EV3 (i.e., "buffer full"). Thus, any device 244, 246, and 248 may make use of one or more interrupts 252, 254, 256, 258, each interrupt being associated with its own unique identifying information ID1, ID2, ID3, IDn, possibly including a device identification DEV1, DEV2, DEVn and an event identification EV1, EV2, EV3 . . . , EVn. The interrupt receiver 232 is therefore capable of receiving the identifying information ID1, ID2, ID3, . . . , IDn corresponding to each one of a plurality of interrupts 252, 254, 256, and 258.

Each interrupt handler 234, 236, 238, 240, 242 is capable of being operatively coupled to the interrupt receiver 232 and of responding to selected interrupts based on the identifying information corresponding to each one of the interrupts. And, as described above, each one of the interrupt handlers 234, 236, 238, 240, 242 is capable of responding to an interrupt of the respective type that it processes, during a time period when any other one of the interrupt handlers is responding to another respective type of interrupt.

One or more of the interrupt handlers 234, 236, 238, 240, 242 may be included in a single device driver module, and any number of interrupts may originate with a single device associated with the single driver module. Each device 244, 246, 248 is capable of being operatively coupled to the processor 250, and an operating system 260 may be used to schedule execution of the individual interrupt handlers 234, 236, 238, 240, 242.

For example, as shown in FIG. 2, the device driver module 262 may include interrupt handlers 234, 236, and the device driver module 264 may include the interrupt handler 238. Interrupt handlers 234 and 236 may be used to process interrupts 252 and 254, respectively, and the interrupt handler 238 may be used to process the interrupt 256. Similarly, the device driver module 266 may include any number of interrupt handlers 240, 242 which are used to process one or more respective interrupts 258. A single device 244 may generate multiple respective interrupts (e.g., respective interrupts 252 and 254), or a single device 246 may generate a single respective interrupt (e.g., respective interrupt 256). In any event, those skilled in the art will realize that the interrupt handlers 234, 236, 238, 240, 242 may be software modules capable of executing in an overlapping fashion as multiple threads in a multi-threaded execution environment.

In another embodiment of the invention, it can be seen that a system 268 may include a processor 250 and a memory 270 capable of being operatively coupled to the processor 250. The memory 270, for example, may be used to store a set of program instructions included in the device drivers 262, 264, 266 for execution by the processor 250.

The system 268 may also include an interrupt receiver 232 capable of being operatively coupled to the processor 250 and the memory 270, and of receiving identifying information corresponding to each one of any number of interrupts 252, 254, 256, 258, along with a plurality of interrupt handlers 234, 236, 238, 240, 242, each capable of being operatively coupled to the interrupt receiver 232 and responding to a respective, unique interrupt (i.e., a selected device interrupting due to the occurrence of a selected event) based on the identifying information received.

Interrupt responses and processing may occur at practically any time within the constraints of a multi-threaded or multi-processing system, even when other interrupts asserted by a particular device are already being processed. However, the interrupts are always uniquely identified due to the associated identifying information. If the device identification is the same, then the event identification may be different. If the event identification is the same, then the device identification may be different. In any case, the number of interrupt handlers 234, 236, 238, 240, 242 which may be executed in a substantially simultaneous fashion is limited only by the hardware and/or software used to implement the system 268.

It should be noted that the devices 244, 246, and 246, the processor 250, the interrupt receiver 232, the device drivers 262, 264, 266, and the interrupt handlers 234, 236, 238, 240, 242 may all be characterized as "modules" herein. Such modules may include hardware circuitry, such as a microprocessor and/or memory circuits, software program modules, and/or firmware, and combinations thereof, as directed by the architect of the apparatus 230 and system 268, and as appropriate for particular implementations of various embodiments of the invention.

One of ordinary skill in the art will understand that the apparatus and system of various embodiments of the present invention can be used in applications other than desktop computers and systems which include networked servers or devices, and thus, the invention is not to be so limited. The illustrations of an apparatus 230 and a system 268 are intended to provide a general understanding of the structure of various embodiments of the present invention, and they are not intended to serve as a complete description of all the elements and features of apparatus and systems that might make use of the structures described herein.

Applications that may include the novel apparatus and system of various embodiments of the present invention include electronic circuitry used in high-speed computers, communications and signal processing circuitry, processor modules, embedded processors, and application-specific modules, including multilayer, multi-chip modules. Such apparatus and systems may further be included as sub-components within a variety of electronic systems, such as televisions, cellular telephones, personal computers, radios, vehicles, and others.

Figure 3:
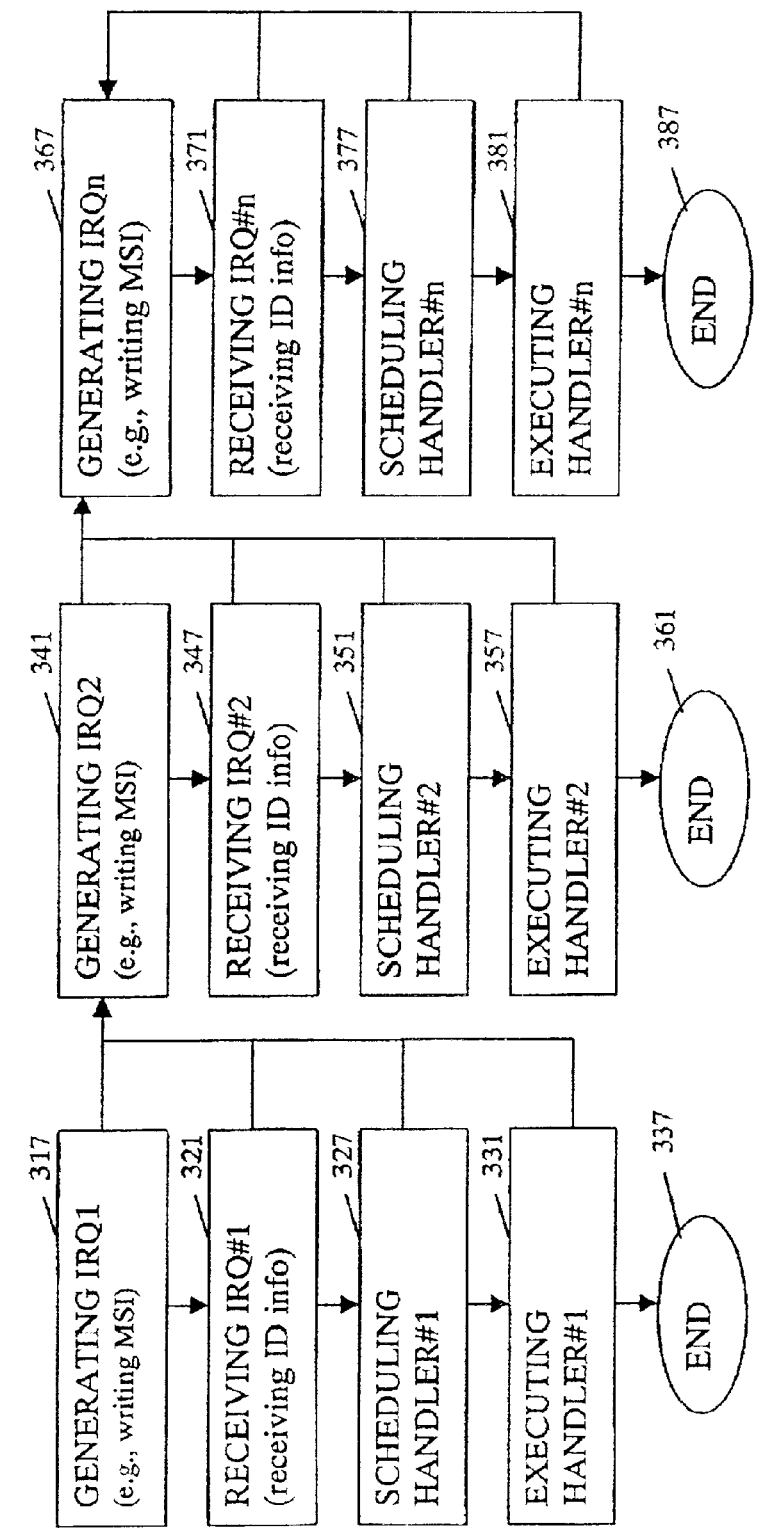
FIG. 3 illustrates a method of processing interrupts according to an embodiment of the present invention.

FIG. 3 illustrates a method of processing interrupts according an embodiment of the present invention. The method 311 may include writing a unique message to a memory location, such as occurs with a MSI, or engaging in some other activity to generate an interrupt at block 317, and then receiving an indication corresponding to the interrupt at block 321. Receiving the interrupt may include receiving identifying information, such as a device identification and an event identification, as described previously. The interrupt handler corresponding to the interrupt generated at block 317 may then be scheduled for execution at block 327. The handler may then be executed at block 331, and this portion of the method may end at terminal block 337 (even if a second and subsequent interrupts are being processed, as described below).

Operation of various embodiments of the invention may include generation and reception of a second interrupt (and subsequent interrupts) after receiving the first interrupt, at blocks 341 and 347. The second interrupt may be generated (and received) at any time after the first interrupt is generated, subject to the physical constraints of the devices generating the interrupts, and their connections to the interrupt receiver. Again, the interrupt may be generated in any number of ways, including the use of a MSI. Thus, receiving the interrupt may include receiving identifying information, such as a device identification and an event identification, as described previously, at block 347.

The interrupt handler corresponding to the interrupt generated at block 341 may then be scheduled for execution at block 351. The handler corresponding to the generated interrupt (based on the associated identifying information) may then be executed at block 357, even if the first interrupt is still being processed by the handler whose execution began at block 331. This portion of the method may end at terminal block 361 (even if the first interrupt is still being processed at block 331).

Other interrupts may also be generated and received at any time after the first and/or second interrupts are generated. This is indicated by the series of blocks 367, 371, 377, 381, and 387. Thus, other interrupts may be generated at block 367 (and received at block 371) at any time after the first and second interrupts are generated. Again, these other interrupts may be generated in any number of ways, including the use of the MSI mechanism. Thus, receiving subsequent interrupts may include receiving identifying information, such as a device identification and an event identification, as described previously, at block 371, and the interrupt handler corresponding to the subsequent interrupt generated at block 367 may then be scheduled for execution at block 377. The handler corresponding to the subsequently generated interrupt (based on the associated identifying information) may then be executed at block 381, even if the first and/or second interrupts are still being processed by the handlers whose execution began at blocks 331 and 357, respectively. This portion of the method may end at terminal block 387, or may continue with the generation of still further interrupts, beginning at block 367, and occurring at any time after the generation of the initial subsequent interrupt at block 367.

As noted previously, several interrupt handlers may be included in a single device driver, and several interrupts may be received from a single device. If a device interrupts by writing several MSIs to various memory locations, or with various message data values, then each of the handlers corresponding to the various interrupts may be scheduled for execution. Thus, the interrupt response latency is reduced by using various embodiments of the invention, since a handler can be scheduled for execution immediately after the interrupt occurs, rather than waiting until the previous interrupt, possibly submitted to the system by the same device driver, has finished being processed. Individual MSI messages, for example, can be used to trigger individual interrupt handlers, executing in parallel as needed, and the individual handlers may be optimized for processing each corresponding interrupt event.

It should be noted that while MSIs have been used as an example of an interrupt generation mechanism herein, other mechanisms may also be used according to various embodiments of the invention, including apparatus, systems, and methods, and therefore, the invention is not to be so limited. For example, some embodiments of the invention may be applied to the use of legacy interrupts, where a device status register or memory location must be accessed to determine which interrupt handler should be initiated. Therefore, it should be clear that some embodiments of the present invention may also be described in the context of computer-executable instructions, such as program modules, being executed by a computer. Generally, program modules may include routines, programs, objects, components, data structures, etc. that perform particular tasks or implement particular abstract data types. As such, the memory 270 (refer to FIG. 2) included in some embodiments of the present invention may include software operative on the processor 250 to perform various methods according to the examples disclosed herein.

One of ordinary skill in the art will understand, upon reading and comprehending this disclosure, the manner in which a software program can be launched from a computer-readable medium in a computer-based system to execute the functions defined in the software program. One of ordinary skill in the art will further understand the various programming languages which may be employed to create a software program designed to implement and perform the methods of various embodiments of the present invention. The programs can be structured in an object-orientated format using an object-oriented language such as Java, Smalltalk, or C++. Alternatively, the programs can be structured in a procedural-orientated format using a procedural language, such as COBOL or C. The software components may communicate using any of a number of mechanisms that are well-known to those skilled in the art, such as application program interfaces (APIs) or interprocess communication techniques such as the Remote Procedure Call (RPC), Common Object Request Broker Architecture (see The Common Object Request Broker: Architecture and Specification, OMG, Revision 2.0: July 1995, updated July 1996, Revision 2.1: August 1997, available via FTP at: ftp://ftp.omg.org/pub/docs/formal/97-09-01.pdf), Component Object Model (see The Component Object Model Specification Draft Version 0.9, Oct. 24, 1995, available at http://www.microsoft.com/com/resources/comdocs.asp), Distributed Component Object Model (see Distributed Component Object Model Protocol—DCOM/1.0, available at http://www.microsoft.com/isapi/gomsdn.asp?TARGET=/library/specs/distributedcomponentobjectmodelprotocoldcom10.htm), and Remote Method Invocation (see Java™ Remote Method Invocation, Revision 1.50, JDK 1.2, October 1998, available at http://java.sun.com/products/jdk/1.2/docs/guide/rmi/spec/rmi-title.doc.html). However, as will be appreciated by one of ordinary skill in the art upon reading this disclosure, the teachings of various embodiments of the present invention are not limited to any particular programming language or environment.

As is evident from the preceding description, the processor 250 (refer to FIG. 2) may access at least some form of computer-readable media, such as the memory 270. However, computer-readable and/or accessible media may be any available media that can be accessed by the apparatus 230, processor 250, and system 268. By way of example and not limitation, computer-readable media may comprise computer storage media and communications media. Computer storage media includes volatile and non-volatile, removable and non-removable media implemented in any method or technology for storage of information such as computer-readable instructions, data structures, program modules or other data. Communication media specifically embodies computer-readable instructions, data structures, program modules or other data in a modulated data signal such as a carrier wave, coded information signal, and/or other transport mechanism, which includes any information delivery media. The term "modulated data signal" means a signal that has one or more of its characteristics set or changed in such a manner as to encode information in the signal. By way of example and not limitation, communications media also includes wired media such as a wired network or direct-wired connections, and wireless media such as acoustic, optical, radio frequency, infrared and other wireless media. Combinations of any of the above are also included within the scope of computer-readable and/or accessible media.

Thus, referring back to FIG. 2, it is now easily understood that another embodiment of the invention may include an article 290 comprising a machine-accessible medium having associated data, wherein the data, when accessed, results in a machine (e.g. a processor or computer) performing activities such as: receiving a first interrupt, receiving a second interrupt (after receiving the first interrupt), executing a first interrupt handler in response to identifying information associated with the first interrupt, and executing a second interrupt handler in response to identifying information associated with the second interrupt. As noted above, the execution of the second interrupt handler (and subsequent interrupt handlers) may occur during a time period when the first interrupt handler is being executed. Other activities performed by the machine may include, for example, writing one or more MSI messages (uniquely associated with various interrupts) to one or more memory locations; receiving identifying information associated with each interrupt, possibly including a device identifier and an event identifier; and scheduling the execution of the various corresponding interrupt handlers using an operating system.

Thus, various embodiments of the invention may provide a mechanism for reducing interrupt latency through the use of multiple MSIs and concurrent interrupt handlers. Each MSI, in accordance with various embodiments of the invention may uniquely identify both the device and the event that triggered the interrupt, and therefore, the device driver or operating system can quickly schedule an interrupt handler specific to that event. As a result, the handler executes sooner and requires less processing time, thereby reducing the overall interrupt latency. In addition, this allows multiple interrupt handlers to execute concurrently, reducing interrupt latency even further. Unlike processes involving single-threaded handlers, unrelated interrupts do not have to "wait" while a particular handler cleans up "earlier" interrupt events. In particular, some embodiments of this invention may work well using a multi-processor system, where each handler may execute on a separate processor. Device drivers may then ultimately handle the same number of interrupts, but in significantly less time than is required using a single handler. Drivers made according to embodiments of the present invention for parallel devices (e.g., a NIC that is able to receive and transmit packets at the same time, or a NIC that has multiple receive queues used for quality of Service (QoS) or other packet classification) may realize even greater benefits. Thus, MSI messages according to embodiments of the invention may be used to trigger interrupt handlers directly, rather than via an Interrupt Service Routine (ISR) that indirectly schedules other threads. Some embodiments of the current invention may be used in an environment or operating system that does not support separate ISR's and/or Deferred Procedure Calls.

Although specific embodiments have been illustrated and described herein, those of ordinary skill in the art will appreciate that any arrangement which is calculated to achieve the same purpose may be substituted for the specific embodiment shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of embodiments of the invention includes any other applications in which the above structures and methods are used. The scope of embodiments of the invention should be determined with reference to the appended claims, along with the full range of equivalents to which such claims are entitled.

It is emphasized that the Abstract is provided to comply with 37 C.F.R. §1.72(b). It is submitted with the understanding that it will not be used to interpret or limit the scope or meaning of the claims.

In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. An apparatus, comprising:
    a first interrupt handler to respond to a first one of a plurality of interrupts based on identifying information corresponding to the first one of the plurality of interrupts; and
    a second interrupt handler to respond to a second one of the plurality of interrupts based on identifying information corresponding to the second one of the plurality of interrupts, wherein the second interrupt handler is capable of responding to the second one of the plurality of interrupts during a time period when the first interrupt handler is responding to the first one of the plurality of interrupts.

2. The apparatus of claim 1, wherein the identifying information includes a device identification and an event identification.

3. The apparatus of claim 1, wherein the first and second interrupt handlers are included in a single device driver module, and wherein the first one and the second one of the plurality of interrupts originate with a single device associated with the single device driver module.

4. The apparatus of claim 1, wherein the first and second interrupt handlers each include software modules capable of executing in an overlapping fashion as two threads in a multi-threaded execution environment.

5. The apparatus of claim 1, further comprising:
a device capable of being operatively coupled to an interrupt receiver and of generating at least the first one and the second one of the plurality of interrupts.

6. The apparatus of claim 1, further comprising:
a first device capable of being operatively coupled to an interrupt receiver and of generating at least the first one of the plurality of interrupts; and
a second device capable of being operatively coupled to the interrupt receiver and of generating at least the second one of the plurality of interrupts.

7. A system, comprising:
an interrupt receiver to receive identifying information corresponding to each one of a plurality of interrupts;
a first interrupt handler capable of being operatively coupled to the interrupt receiver and to respond to a first one of the plurality of interrupts based on the identifying information corresponding to the first one of the plurality of interrupts; and
a second interrupt handler capable of being operatively coupled to the interrupt receiver and to respond to a second one of the plurality of interrupts based on the identifying information corresponding to the second one of the plurality of interrupts, wherein the second interrupt handler is capable of responding to the second one of the plurality of interrupts during a time period when the first interrupt handler is responding to the first one of the plurality of interrupts.

8. The system of claim 7, further comprising:
a third interrupt handler capable of being operatively coupled to the interrupt receiver and responding to a third one of the plurality of interrupts based on the identifying information corresponding to the third one of the plurality of interrupts, wherein the third interrupt handler is capable of responding to the third one of the plurality of interrupts during a time period when the first and second interrupt handlers are responding to the first one and the second one of the plurality of interrupts.

9. The system of claim 7, further comprising:
a plurality of interrupt handlers capable of being operatively coupled to the interrupt receiver and responding to a subset of the plurality of interrupts based on the identifying information corresponding to the subset of the plurality of interrupts, wherein the plurality of interrupt handlers are capable of responding to the subset of the plurality of interrupts during a time period when the first and second interrupt handlers are responding to the first one and the second one of the plurality of interrupts.

10. The system of claim 7, further comprising:
a first device capable of being operatively coupled to the interrupt receiver and of generating at least the first one of the plurality of interrupts; and
a second device capable of being operatively coupled to the interrupt receiver and of generating at least the second one of the plurality of interrupts.

11. The system of claim 10, wherein the identifying information associated with the first one and the second one of the plurality of interrupts includes a device identification and an event identification, and wherein the device identification for the identifying information associated with the first device is the same as the device identification for the identifying information associated with the second device, and wherein the event identification of the identifying information associated with the first device is not the same as the event identification of the identifying information associated with the second device.

12. The system of claim 7, wherein the first one and the second one of the plurality of interrupts are message-signaled interrupts.

13. The system of claim 7, further comprising:
a memory capable of being operatively coupled to the interrupt receiver, the memory being used to store a set of program instructions included in the first device driver and executed by a processor.

14. A method, comprising:
receiving a first interrupt;
receiving a second interrupt after receiving the first interrupt;
executing a first interrupt handler in response to identifying information associated with the first interrupt; and
executing a second interrupt handler in response to identifying information associated with the second interrupt during a time period when the first interrupt handler is being executed in response to the first interrupt.

15. The method of claim 14, wherein the first interrupt handler and the second interrupt handler are included in a single device driver.

16. The method of claim 14, wherein the first and the second interrupts are received from a single device.

17. The method of claim 14, wherein the first interrupt handler is included in a first device driver, wherein the second interrupt handler is included in a second device driver, and wherein the first and second device drivers are associated with a first and a second device, respectively, the first and second devices being different from each other.

18. An article comprising a machine-accessible medium having associated data, wherein the data, when accessed, results in a machine performing:
receiving a first interrupt;
receiving a second interrupt after receiving the first interrupt;
executing a first interrupt handler in response to identifying information associated with the first interrupt; and
executing a second interrupt handler in response to identifying information associated with the second interrupt during a time period when the first interrupt handler is being executed in response to the first interrupt.

19. The article of claim 18, wherein the machine-accessible medium further includes data, which when accessed by the machine, results in the machine performing:
writing a message-signaling interrupt message to a memory location, wherein the message-signaling interrupt message is associated with the first interrupt.

20. The article of claim 18, wherein receiving a first interrupt further includes:
receiving identifying information associated with the first interrupt including a device identifier and an event identifier.

21. The article of claim 18, wherein the machine-accessible medium further includes data, which when accessed by the machine, results in the machine performing:
scheduling execution of the first and second interrupt handlers using an operating system.

* * * * *